(12) United States Patent
Zhao et al.

(10) Patent No.: US 11,934,449 B2
(45) Date of Patent: Mar. 19, 2024

(54) METHOD AND APPARATUS FOR PROCESSING MAP INFORMATION, AND STORAGE MEDIUM

(71) Applicant: Beijing Baidu Netcom Science Technology Co., Ltd., Beijing (CN)

(72) Inventors: Jia Zhao, Beijing (CN); Meng Xu, Beijing (CN); Kun Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/941,220

(22) Filed: Sep. 9, 2022

(65) Prior Publication Data
US 2023/0139243 A1    May 4, 2023

(30) Foreign Application Priority Data
Oct. 28, 2021  (CN) .......................... 202111266450.1

(51) Int. Cl.
*G06F 16/00*    (2019.01)
*G06F 16/245*   (2019.01)
*G06F 16/538*   (2019.01)
*G06F 16/583*   (2019.01)
*G06F 16/587*   (2019.01)

(52) U.S. Cl.
CPC .......... *G06F 16/538* (2019.01); *G06F 16/245* (2019.01); *G06F 16/5854* (2019.01); *G06F 16/587* (2019.01)

(58) Field of Classification Search
CPC .. G06F 16/538; G06F 16/245; G06F 16/5854; G06F 16/587; G06F 16/29; G06F 16/9537; H04W 4/021; G01C 21/20; G01C 21/3623; G01C 21/3811; G01C 21/3476; G01C 21/3667; G01C 21/3856;
(Continued)

(56) References Cited

U.S. PATENT DOCUMENTS

| | | | |
|---|---|---|---|
| 2009/0083237 A1* | 3/2009 | Gelfand | G06F 16/58 |
| 2011/0137895 A1* | 6/2011 | Petrou | G06F 16/242 |
| | | | 707/723 |
| 2021/0285785 A1* | 9/2021 | Hashimoto | G01C 21/362 |

FOREIGN PATENT DOCUMENTS

| | | |
|---|---|---|
| CN | 104657458 A | 5/2015 |
| CN | 110019599 A | 7/2019 |

(Continued)

OTHER PUBLICATIONS

European Search Report dated Mar. 27, 2023 in corresponding patent application No. 22193175.1-1009.
(Continued)

*Primary Examiner* — Jared M Bibbee
(74) *Attorney, Agent, or Firm* — Norton Rose Fulbright US LLP; James R. Crawford

(57) ABSTRACT

Provided are a method and apparatus for processing map information, a device, and a storage medium which relate to the field of computer technology and, in particular, to the fields of intelligent transportation and computer vision technology. The specific implementation includes that an object in an image for query is recognized to obtain an object recognition result and that a target point of interest matching the image for query is selected from at least one candidate point of interest of an electronic map according to the object recognition result.

17 Claims, 6 Drawing Sheets

---

S110
Recognize an object in an image for query to obtain an object recognition result S120
Select, according to the object recognition result, a target point of interest matching the image for query from at least one candidate point of interest of an electronic map

(58) Field of Classification Search
CPC ........ G06V 10/54; G06V 10/56; G06V 10/74; G06V 20/00
See application file for complete search history.

(56) References Cited

FOREIGN PATENT DOCUMENTS

| | | | |
|---|---|---|---|
| CN | 110609879 | A | 12/2019 |
| CN | 112035751 | A | 12/2020 |
| CN | 112146676 | A | 12/2020 |
| CN | 112860993 | A | 5/2021 |
| CN | 113239295 | A | 8/2021 |
| CN | 113360791 | A | 9/2021 |
| EP | 2450667 | A1 | 5/2012 |
| JP | 2013501976 | A | 1/2013 |
| JP | 2015105903 | A | 6/2015 |
| JP | 2020094815 | A | 6/2020 |

OTHER PUBLICATIONS

Supplemental Search Report issued by CIPO dated Sep. 12, 2023 in corresponding patent application CN 2021112664501 with English translation.
Zhang, et al.: "Hierarchical semantic cognition for urban functional zones with VHR satellite images and POI data," ISPRS Journal of Photogrammetry and Remote Sensing 132, (2017), pp. 170-184.
Zhou, Shengyun: Master Thesis "Ondoor Scene Recognition and Understanding Based on Visual Perception", (2015), Univ. of Electronic Sci. & Technol., China, pp. 1-71, with English Abstract.
Kang Zhizhong: "The reasearch on rapidly realizing 3D visualization for the main body of street sight in Ciber City", a PhD Dissertation of Wuhan University, School of Remote Sensing & Information Eng., Wuhan Univ,. China, (2004), pp. 1-108, with English Abstract.
First Search Report issued by the CIPO dated Jul. 18, 2023 in the corresponding patent application No. 202111266450.1, with English translation.
Office Action issued by the CIPO dated Jul. 18, 2023 in the corresponding patent application No. 202111266450.1, with English translation.
Office Action dated Jul. 6, 2023 by the JPO in the corresponding Patent Application No. 2022-139079, with English translation.

\* cited by examiner

METHOD AND APPARATUS FOR PROCESSING MAP INFORMATION, AND STORAGE MEDIUM

CROSS-REFERENCE TO RELATED APPLICATION

This application claims priority from Chinese Patent Application No. 202111266450.1 filed on Oct. 28, 2021, which is hereby incorporated by reference in its entirety.

TECHNICAL FIELD

The present disclosure relates to the field of computer technology and, in particular, to the fields of intelligent transportation and computer vision technology, for example, a method and apparatus for processing map information, an electronic device, and a computer-readable storage medium.

BACKGROUND

Driven by the rapid development of cities, an electronic map has become a key bridge connecting users and points of interest (POI). A user may query a POI through the electronic map, for example, obtain route planning and real-time navigation to the POI.

SUMMARY

The present disclosure provides a method and apparatus for processing map information, a device, and a storage medium.

According to an aspect of the present disclosure, a method for processing map information is provided. The method includes the steps below.

An object in an image for query is recognized to obtain an object recognition result.

A target point of interest matching the image for query is selected from at least one candidate point of interest of an electronic map according to the object recognition result.

According to another aspect of the present disclosure, an apparatus for processing map information is provided. The apparatus includes an object recognition module and a point-of-interest selection module.

The object recognition module is configured to recognize an object in an image for query to obtain an object recognition result.

The point-of-interest selection module is configured to select, according to the object recognition result, a target point of interest matching the image for query from at least one candidate point of interest of an electronic map.

According to another aspect of the present disclosure, an electronic device is provided. The electronic device includes at least one processor and a memory communicatively connected to the at least one processor.

The memory stores instructions executable by the at least one processor. The instructions are executed by the at least one processor to cause the at least one processor to perform the method for processing map information according to any embodiment of the present disclosure.

According to another aspect of the present disclosure, a non-transitory computer-readable storage medium storing computer instructions is provided. The computer instructions are used for causing a computer to perform the method for processing map information according to any embodiment of the present disclosure.

According to another aspect of the present disclosure, a computer program product is provided. The computer program product includes a computer program. When the computer program is executed by a processor, the method for processing map information according to any embodiment of the present disclosure is performed.

The technology of the present disclosure can improve the convenience and accuracy of processing map information.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, a description of well-known functions and constructions is omitted hereinafter for clarity and conciseness.

Solutions provided in embodiments of the present disclosure are described in detail hereinafter in conjunction with the drawings.

Figure 1:
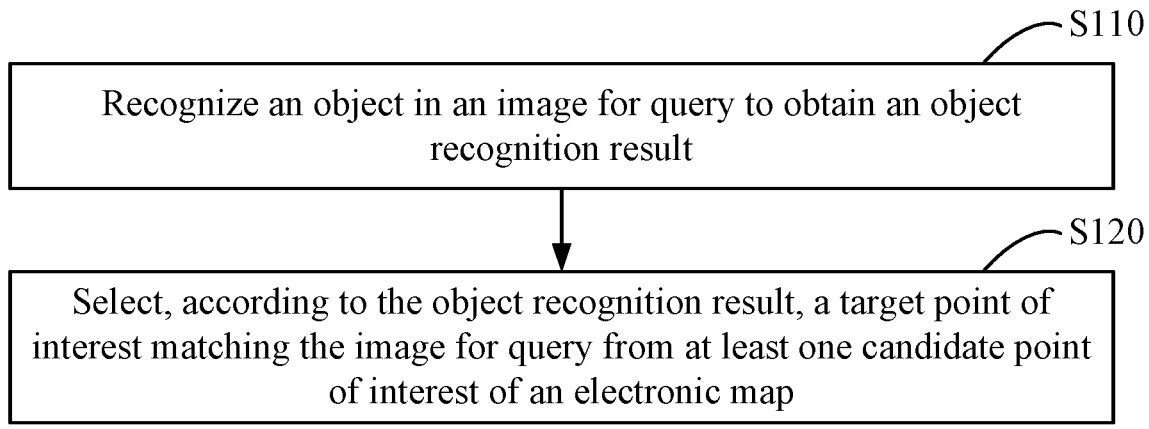
FIG. 1 is a diagram of a method for processing map information according to embodiments of the present disclosure.

FIG. 1 is a diagram of a method for processing map information according to embodiments of the present disclosure. Embodiments of the present disclosure are applicable to the case where an electronic map is used for querying a POI. The method is executable by an apparatus for processing map information. The apparatus may be implemented in hardware and/or software and may be configured in an electronic device. Referring to FIG. 1, the method includes the steps below.

In S110, an object in an image for query is recognized to obtain an object recognition result.

In S120, a target point of interest matching the image for query is selected from at least one candidate point of interest of an electronic map according to the object recognition result.

An image query control may be provided on a query page of the electronic map. Moreover, the image query control may support multiple image acquisition manners. For example, the image query control may support selecting an image from a local album, collecting an image of the object through an image collector, or scanning a scene to which the object belongs through the viewfinder of the image collector. Embodiments of the present disclosure do not specifically limit the manner of acquiring the image for query.

The object in the image for query may be a geographical object, for example, a scenic spot, a school, a bank, a restaurant, a gas station, a hospital, a supermarket, or a scenic area; alternatively, the object may be a non-geographical object, for example, a delicacy, a drug, a scenic postcard, or a brand logo. The object recognition result is used for describing the object and may include at least one of the following: the name of the object, the scene information of the object, the spatial relationship between different objects, or the background information of the object.

For example, the color, texture, shape, space and other visual features of the image for query may be extracted, and the object recognition result is determined according to the visual features. For example, the extracted visual features may be matched with visual features of at least one candidate object in an object library to obtain the object recognition result. Alternatively, a three-dimensional object model may be built based on the visual features and matched with at least one candidate object model in the object library to obtain the object recognition result. Embodiments of the present disclosure do not limit the object recognition manner.

In the case where the object in the image for query is a geographical object, the target point of interest matching the image for query may be determined according to the association relationship between the geographical object and point of interests in the electronic map. For example, in the case where the image for query is an image of a museum, the museum may be taken as the target point of interest. In the case where the object in the image for query is a non-geographical object, a geographical object having the non-geographical object may be determined, and a point of interest associated with the geographical object is taken as the target point of interest. For example, in the case where the image for query is an image of Kung Pao chicken, a restaurant selling Kung Pao chicken may be taken as the target point of interest. In the case where the image for query is an image of hairy crabs, a restaurant or fresh food supermarket selling hairy crabs may be taken as the target point of interest. In the case where the image for query is an image of eye drops, a pharmacy selling such eye drops may be taken as the target point of interest. In the case where the image for query is an image of a logo of an express brand, a store of the express brand may be taken as the target point of interest. In the case where the image for query is an image of an entertainment facility, a place including the entertainment facility may be taken as the target point of interest.

The object in the image for query is recognized, and the target point of interest is selected from the electronic map according to the object recognition result. In this case, on one hand, this method enriches the interaction manner between a user and the electronic map, enabling the user to interact with the electronic map not only through text and voice but also through an image. Especially for an unacquainted object, the user cannot make a description through text or voice but can collect an image of the object and perform a query through the image, improving the convenience and success rate of processing map information. On the other hand, the object recognition result is obtained by recognizing the object in the image for query. The image for query contains a larger amount of information compared with text and voice. For example, backgrounds of the same object are different, and the associated points of interest are different. The object recognition result may not only include the information of the object but also include, for example, the background of the object, the scene of the object, and the relationship with another object. Therefore, the target point of interest is selected according to the object recognition result, further improving the accuracy of processing map information.

Technical solutions of embodiments of the present disclosure enrich the interaction manner between the user and the electronic map as well as improve the convenience, success rate and accuracy of processing map information.

Figure 2:
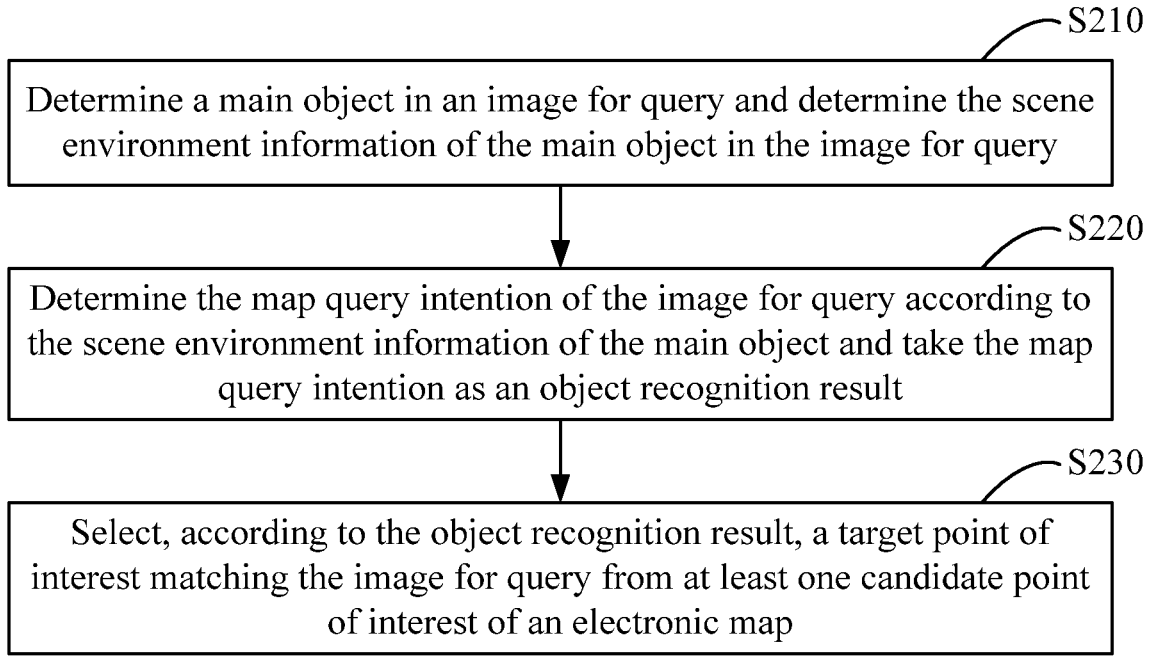
FIG. 2 is a diagram of another method for processing map information according to embodiments of the present disclosure.

FIG. 2 is a diagram of another method for processing map information according to embodiments of the present disclosure. This embodiment is an optional solution provided based on the preceding embodiment. Referring to FIG. 2, the method for processing map information provided in this embodiment includes the steps below.

In S210, a main object in an image for query is determined, and the scene environment information of the main object in the image for query is determined.

In S220, the map query intention of the image for query is determined according to the scene environment information of the main object and taken as an object recognition result.

In S230, a target point of interest matching the image for query is selected from at least one candidate point of interest of an electronic map according to the object recognition result.

The scene environment information of the main object is used for describing the scene environment of the main object in the image for query. The scene environment may be determined according to another object other than the main object. The map query intention is used for representing the point-of-interest query requirements of a user and is related to both the main object and the scene environment information. The information contained in the map query intention is more than the information of the main object. The scene environment information of the same main object in various image for queries may be different. Accordingly, the map query intention represented by the same main object in various scene environment information may be different.

For example, the main object of image for query A and the main object of image for query B are each a piece of cake. The scene environment information of image for query A may be a baking tool such as an eggbeater or a measuring cup. The scene environment information of image for query B may be, for example, red wine or a candle. Correspondingly, the map query intention of image for query A may be a baking studio. The map query intention of image for query B may be a celebration restaurant. Through determining the map query intention of an image for query according to the scene environment information of a main object, different target points of interest may be selected for the same main object according to various map query intention, thereby improving the accuracy of a target point of interest and the matching degree between the target point of interest and user query requirements.

In an optional embodiment, the step in which the scene environment information of the main object in the image for query is determined includes determining a spatial relationship between the main object in the image for query and another object in the image for query, determining the background information of the image for query, and determining the scene environment information of the main object in the image for query according to at least one of the spatial relationship or the background information.

In embodiments of the present disclosure, the main object in the image for query may be recognized; another object in the image for query may also be recognized; and the spatial relationship between the main object and another object is determined. Moreover, the background information of the image for query may also be recognized. The scene environment information may be determined according to the spatial relationship. Alternatively, the scene environment information may be determined according to the background information. Alternatively, the scene environment information may be determined in combination with the spatial relationship and the background information.

For example, the main object of the image for query is flowing water. If the background information is a mountain, the scene environment information may be a mountain stream. If the background information is a roller coaster, the scene environment information may be a water park. The arrangement in which the scene environment information of the main object is determined according to the spatial relationship and/or the background information further enriches the information contained in the scene environment information, thereby improving the accuracy of processing map information.

In technical solutions of embodiments of the present disclosure, the scene environment information of the main object is determined, and the object recognition result is determined according to the scene environment information of the main object, further improving the accuracy of the target point of interest and the matching degree between the target point of interest and user query requirements.

Figure 3A:
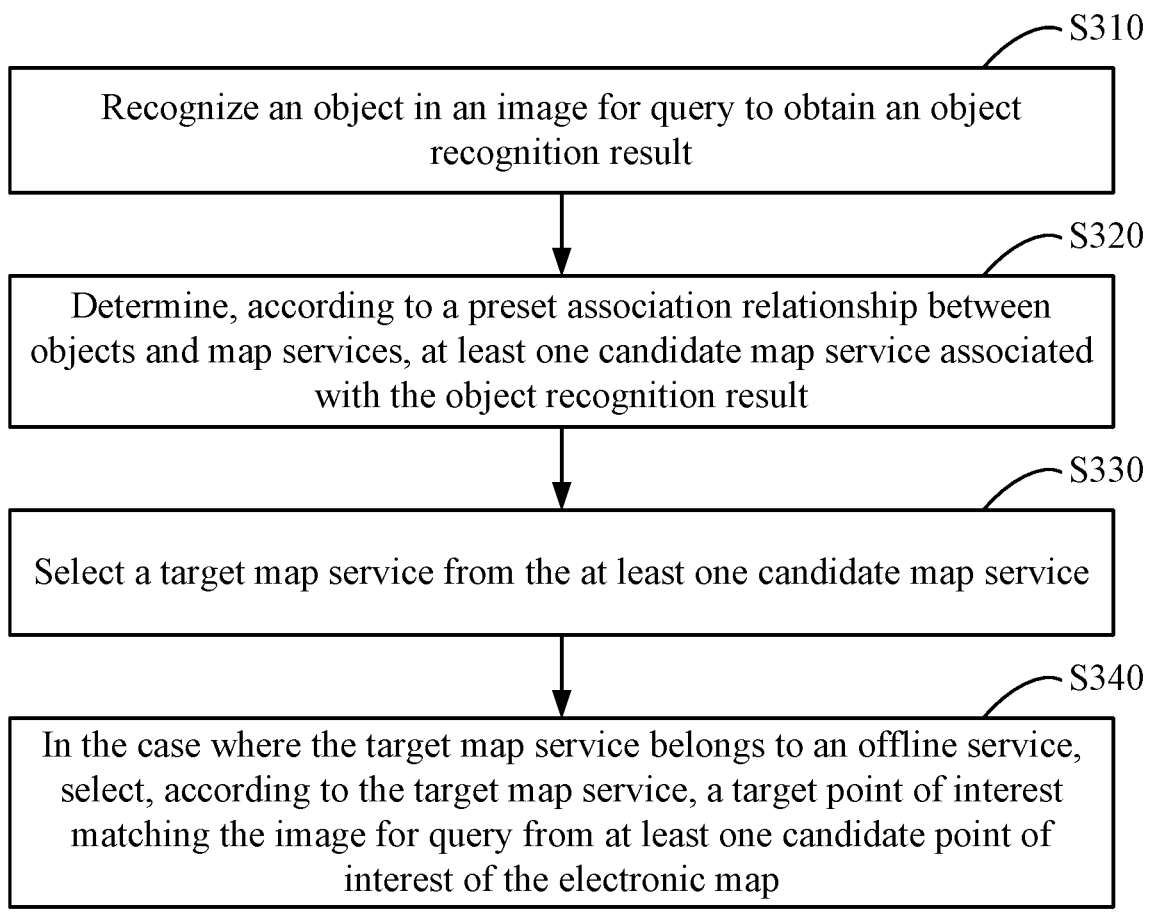
FIG. 3A is a diagram of another method for processing map information according to embodiments of the present disclosure.

FIG. 3A is a diagram of another method for processing map information according to embodiments of the present disclosure. This embodiment is an optional solution provided based on the preceding embodiments. Referring to FIG. 3A, the method of processing map information provided in this embodiment includes the steps below.

In S310, an object in an image for query is recognized to obtain an object recognition result.

In S320, at least one candidate map service associated with the object recognition result is determined according to a preset association relationship between objects and map services.

In S330, a target map service is selected from the at least one candidate map service.

In S340, in the case where the target map service belongs to an offline service, a target point of interest matching the image for query is selected from at least one candidate point of interest of the electronic map according to the target map service.

Figure 3B:
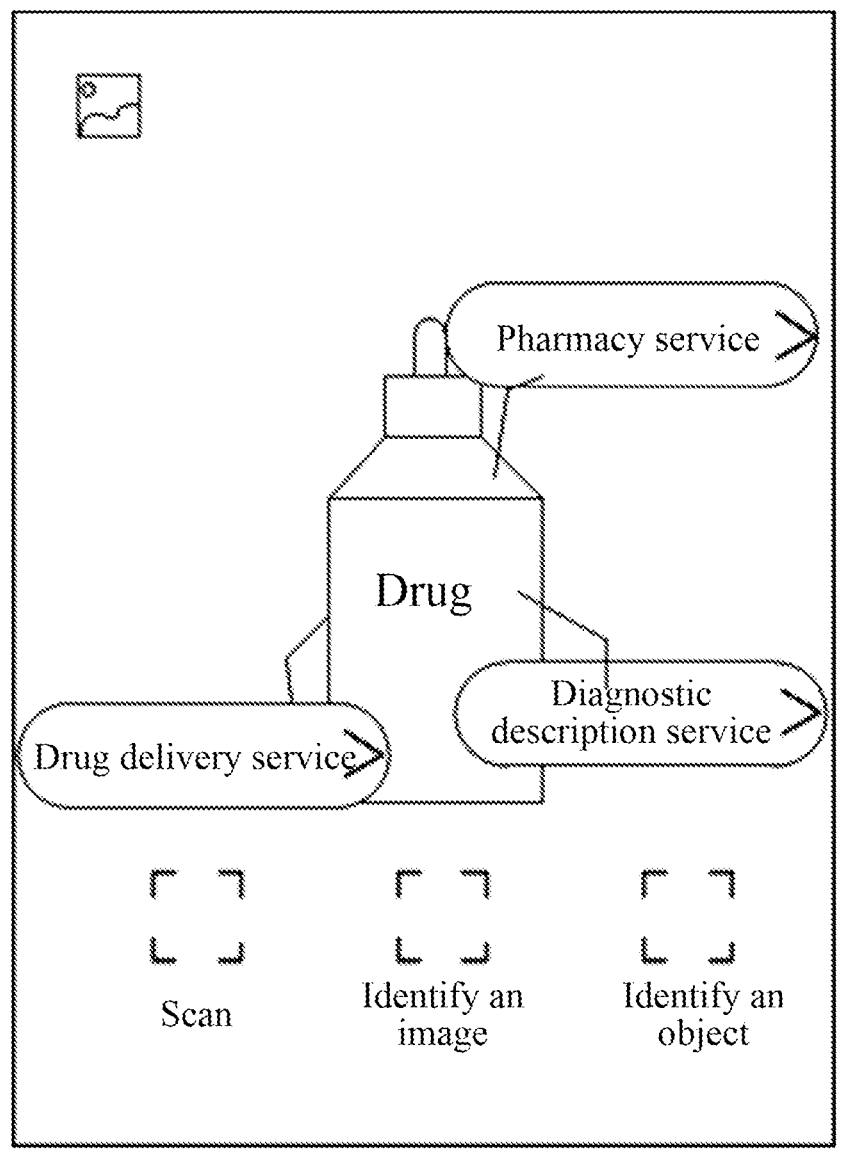
FIG. 3B is a diagram illustrating a drug and associated candidate map services according to embodiments of the present disclosure.
Figure 3C:
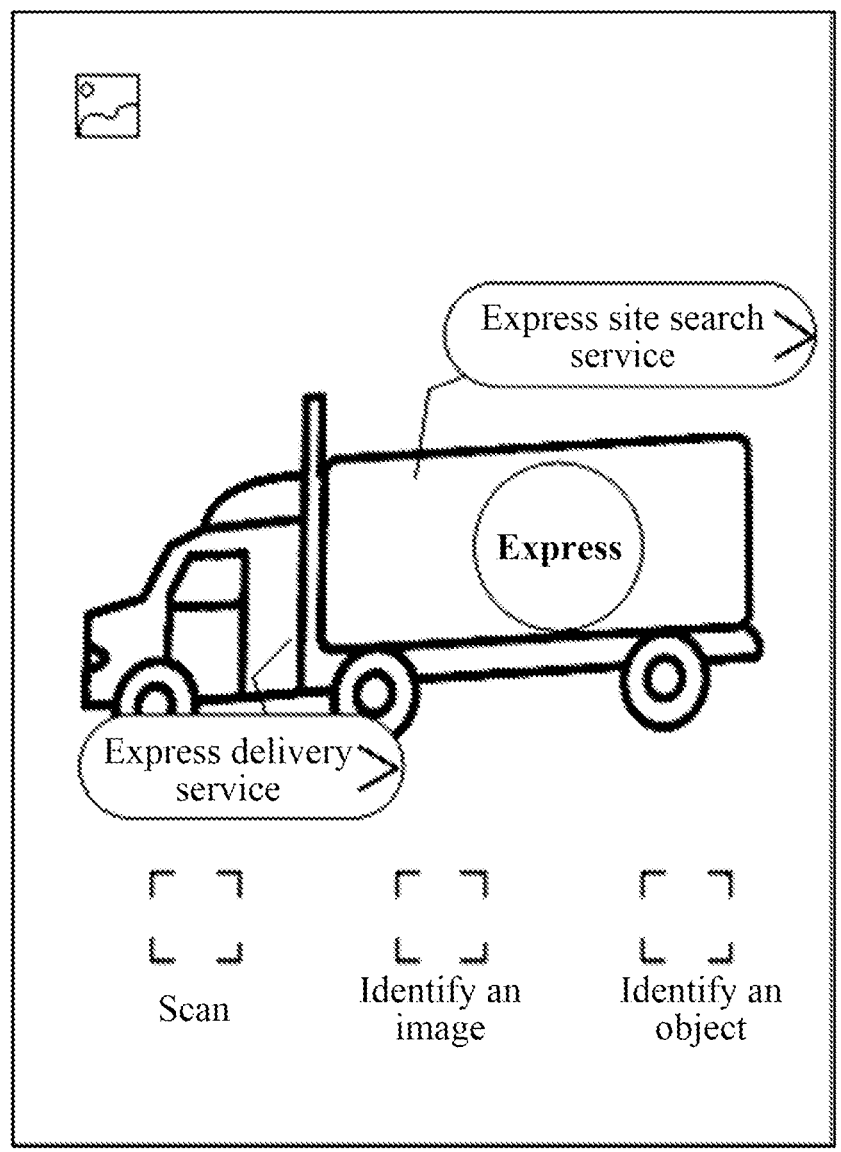
FIG. 3C is a diagram illustrating an express brand and associated candidate map services according to embodiments of the present disclosure.

In embodiments of the present disclosure, the electronic map may be pre-provided with an association relationship between objects and map services. One object may be associated with one map service or may be associated with multiple map services. FIG. 3B is a diagram illustrating a drug and associated candidate map services according to embodiments of the present disclosure. Referring to FIG. 3B, the drug may be associated with a diagnostic description service, a pharmacy service, and a drug delivery service. FIG. 3C is a diagram illustrating an express brand and associated candidate map services according to embodiments of the present disclosure. Referring to FIG. 3C, the express brand may be associated with an express delivery service and an express site search service.

In embodiments of the present disclosure, at least one candidate map service associated with the object recognition result may be determined according to an association relationship between objects and map services. Moreover, after the at least one candidate map service associated with the object recognition result is determined, the at least one candidate map service may be screened to obtain the target map service, and the target map service is provided for a user. Moreover, in the case where the target map service is an offline service, for example, in the case where the target map service is the pharmacy service or the express site search service, the target point of interest may be selected using the target map service. For example, a candidate point of interest that is associated with the target map service and in the electronic map may be taken as the target point of interest according to an association relationship between map services and points of interest. For example, when the target map service is the pharmacy service, a pharmacy selling the drug may be taken as the target point of interest; when the target map service is the express site search service, an express site of the express brand may be taken as a target point of interest. The target map service is selected from the at least one candidate map service associated with the object recognition result; and in the case where the target map service belongs to an offline service, the target point of interest is selected according to the target map service. In this case, a new point-of-interest query manner is provided. Moreover, the arrangement in which at least one map service is screened before the target point of interest is selected helps further improve the matching degree between the target point of interest and user query requirements.

Additionally, it is to be noted that in the case where the target map service belongs to an online service, an online service page, for example, a drug diagnostic description query page, a drug delivery page, or an online express delivery service, is presented. Functions of the electronic map are further enriched by integrating online services with the electronic map.

In an optional embodiment, the step in which the target map service is selected from the at least one candidate map service includes screening the at least one candidate map service according to user attribute information to obtain at least one remaining candidate map service, presenting the at least one remaining candidate map service to the user, and selecting the target map service from the at least one candidate map service according to a selection operation on the at least one remaining candidate map service.

In an optional embodiment, the user attribute information includes at least one of the following: user query time, user location information, a user traveling mode, or a user preference.

For example, the at least candidate map service associated with the object recognition result may be screened according to, for example, the user query time, the user location information, the user traveling mode, the user preference, or user historical behavior characteristics so that any candidate map service not matching the object recognition result is filtered out. Moreover, the target map service is selected from at least one remaining map service according to a user selection operation. In an example in which the at least candidate map service includes the express delivery service and the express site search service, the express site search service may be filtered out in the case where the user query time is the rest time of the express site. In an example in which the at least candidate map service includes a takeaway service and a restaurant service, the takeaway service may be taken as the target map service in the case where the user query time is workday lunchtime. The arrangement of screening the at least one candidate map service according to the personalized user attribute information and supporting manual screening for the at least one candidate map helps further improve the matching degree of the target map service and user query requirements.

In technical solutions of embodiments of the present disclosure, the at least one candidate map service is screened, further improving the matching degree of the target map service and user query requirements.

Figure 4:
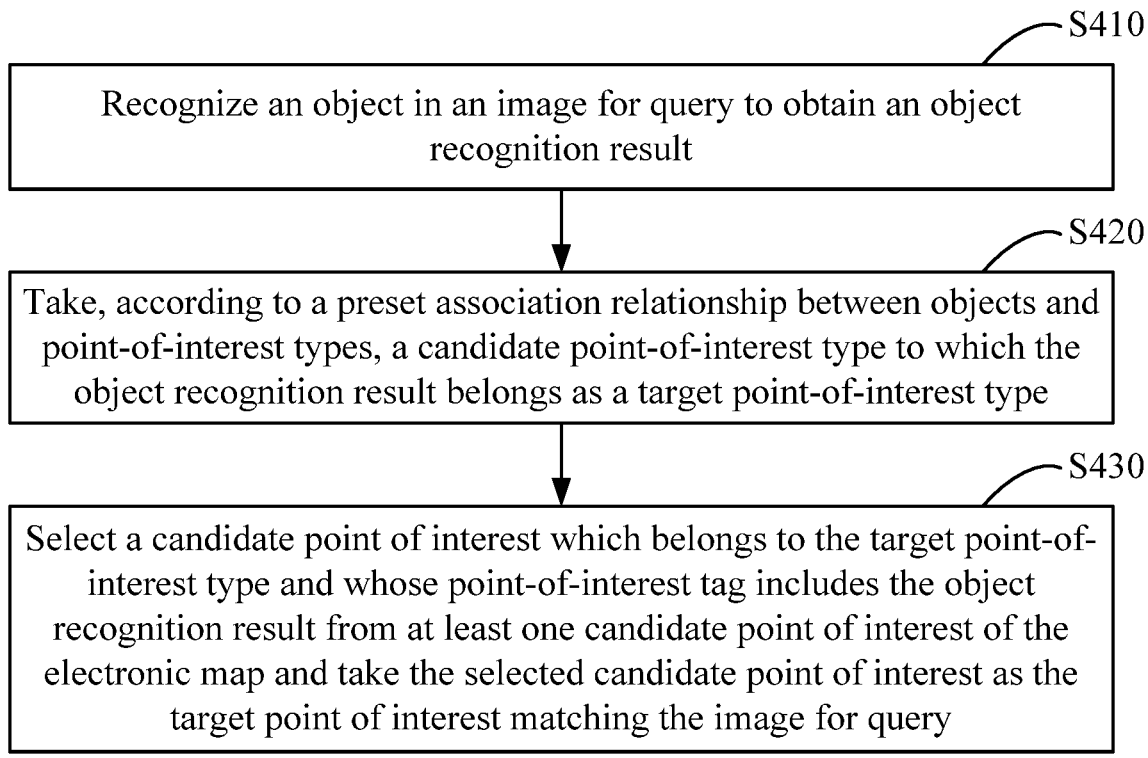
FIG. 4 is a diagram of another method for processing map information according to embodiments of the present disclosure.

FIG. 4 is a diagram of another method for processing map information according to embodiments of the present disclosure. This embodiment is an optional solution provided based on the preceding embodiments. Referring to FIG. 4, the method of processing map information provided in this embodiment includes the steps below.

In S410, an object in an image for query is recognized to obtain an object recognition result.

In S420, a candidate point-of-interest type to which the object recognition result belongs is taken as a target point-of-interest type according to a preset association relationship between objects and point-of-interest types.

In S430, a candidate point of interest which belongs to the target point-of-interest type and whose point-of-interest tag includes the object recognition result is selected from at least one candidate point of interest of the electronic map and taken as the target point of interest matching the image for query.

In embodiments of the present disclosure, the electronic map may be pre-provided with an association relationship between objects and point-of-interest types. Any object may be associated with a point-of-interest type. For example, the point-of-interest type associated with a mountain stream is a scenic spot; the point-of-interest type associated with a scenic postcard is a scenic spot; and the point-of-interest type associated with pizza is a delicacy. The target point-of-interest type associated with the object recognition result may be determined according to an association relationship between objects and point-of-interest types.

Moreover, the electronic map may be also preset with multiple point-of-interest tags. That is, in addition that the electronic map is preset with multiple point-of-interest types, at least one point-of-interest tag may also be preset under any point-of-interest type. Each point-of-interest tag is used for representing different point-of-interest subclasses included by the point-of-interest type. In an example in which a point-of-interest type is a scenic spot, a point-of-interest tag may be, for example, a mountain stream, a theme park, a temple, a museum, or a seashore. Each candidate point of interest belonging to the target point-of-interest type may be acquired. Moreover, the object recognition result is matched with the point-of-interest tag of each candidate point of interest. If the point-of-interest tag of any candidate point of interest includes the object recognition result, the candidate point of interest is taken as the target candidate point of interest; otherwise, the candidate point of interest is filtered out. In an example in which the object recognition result is a mountain stream, a candidate point of interest which belongs to the type of a scenic spot and has the tag of a mountain stream is taken as the target point of interest. The introduction of various point-of-interest types and various point-of-interest tags included in the point-of-interest types enriches the point-of-interest query manner regarding the selection of the target point of interest for the object recognition result. Moreover, the arrangement of a single point-of-interest type is subdivided into different point-of-interest tags improves the matching accuracy of points of interest and thereby further improves the matching degree of the target point of interest and user query requirements.

In an optional embodiment, after the target point of interest matching the image for query is selected from at least one candidate point of interest of the electronic map, the method further includes that at least one candidate map service associated with the target point of interest is determined according to a preset association relationship between points of interest and map services and that the at least one candidate map service is screened according to user attribute information to obtain a target map service.

In an optional embodiment, the user attribute information includes at least one of the following: user query time, user location information, a user traveling mode, or a user preference.

In embodiments of the present disclosure, the electronic map may be pre-provided with an association relationship between points of interest and map services. Any point of interest may be associated with at least one map service. For example, a map service associated with a restaurant point of interest may be a takeaway service or a restaurant service; and a map service associated with a scenic spot point of interest may be, for example, a route planning service or a traveling strategy service.

For example, the at least one candidate map service associated with the target point of interest may be determined. Moreover, the at least one candidate map service is screened in a personalized manner according to the user attribute information to obtain the target map service. In an example in which the target point of interest is a scenic spot, it may be determined, according to the user location information and the location information of the target point of interest, whether the target point of interest belongs to a local scenic spot or a remote scenic spot. In the case where the target point of interest belongs to a local scenic spot, the route planning service is taken as the target map service. In the case where the target point of interest belongs to a remote scenic spot, the traveling strategy service is taken as the target map service. The arrangement in which the at least one candidate map service is screened in combination with personalized user information helps improve the matching degree between the target map service and user query requirements.

In technical solutions of embodiments of the present disclosure, the introduction of different point-of-interest tags for point-of-interest types improves the classification accuracy of points of interest and further improves the matching degree between the target point of interest and user query requirements. Moreover, the target map service may also be provided for the target point of interest, expanding functions of the electronic map.

Figure 5:
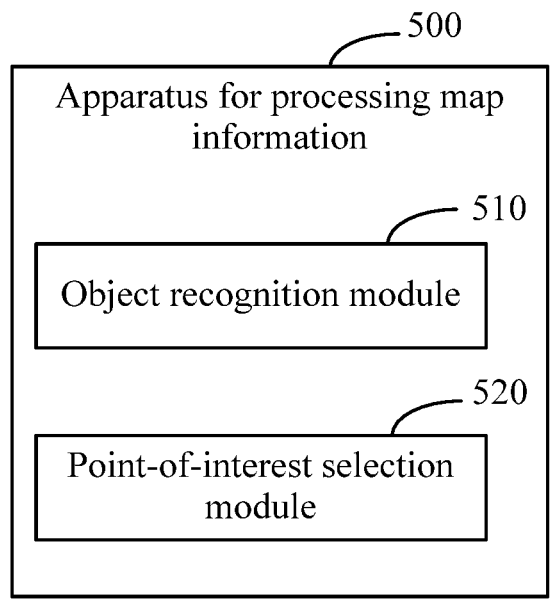
FIG. 5 is a diagram of an apparatus for processing map information according to embodiments of the present disclosure.

FIG. 5 is a diagram of an apparatus for processing map information according to embodiments of the present disclosure. This embodiment is applicable to the case of using an electronic map to query a POI. The apparatus is configured in an electronic device and can implement the method of processing map information according to any embodiment of the present disclosure. Referring to FIG. 5, the apparatus 500 for processing map information includes an object recognition module 510 and a point-of-interest selection module 520.

The object recognition module 510 is configured to recognize an object in an image for query to obtain an object recognition result.

The point-of-interest selection module 520 is configured to select, according to the object recognition result, a target point of interest matching the image for query from at least one candidate point of interest of an electronic map.

In an optional embodiment, the object recognition module 510 includes a main object unit, a scene environment unit, and a query intention unit.

The main object unit is configured to determine a main object in the image for query.

The scene environment unit is configured to determine the scene environment information of the main object in the image for query.

The query intention unit is configured to determine, according to the scene environment information of the main object, the map query intention of the image for query and take the map query intention as the object recognition result.

In an optional embodiment, the scene environment unit includes a spatial relationship sub-unit, a background sub-unit, and a scene environment sub-unit.

The spatial relationship sub-unit is configured to determine a spatial relationship between the main object in the image for query and another object in the image for query.

The background sub-unit is configured to determine the background information of the image for query.

The scene environment sub-unit is configured to determine the scene environment information of the main object in the image for query according to the spatial relationship and/or the background information.

In an optional embodiment, the point-of-interest selection module 520 includes a candidate service unit, a target service unit, and a point-of-interest selection unit.

The candidate service unit is configured to determine, according to a preset association relationship between objects and map services, at least one candidate map service associated with the object recognition result.

The target service unit is configured to select a target map service from the at least one candidate map service.

The point-of-interest selection unit is configured to, in the case where the target map service belongs to an offline service, select, according to the target map service, the target point of interest matching the image for query from the at least one candidate point of interest of the electronic map.

In an optional embodiment, the target service unit includes a candidate service screening sub-unit, a candidate service presentation sub-unit, and a target service sub-unit.

The candidate service screening sub-unit is configured to screen the at least one candidate map service according to user attribute information to obtain at least one remaining candidate map service.

The candidate service presentation sub-unit is configured to present the at least one remaining candidate map service to a user.

The target service sub-unit is configured to select the target map service from the at least one candidate map service according to a selection operation on the at least one remaining candidate map service.

In an optional embodiment, the point-of-interest selection module 520 includes a target point-of-interest type unit and a target point-of-interest unit.

The target point-of-interest type unit is configured to take, according to a preset association relationship between objects and point-of-interest types, a candidate point-of-interest type to which the object recognition result belongs as a target point-of-interest type.

The target point-of-interest unit is configured to select, from the at least one candidate point of interest of the electronic map, a candidate point of interest which belongs to the target point-of-interest type and whose point-of-interest tag includes the object recognition result and take the selected candidate point of interest as the target point of interest matching the image for query.

In an optional embodiment, the apparatus 500 for processing map information further includes a map service module. The map service module includes a candidate map service unit and a target map service unit.

The candidate map service unit is configured to determine, according to a preset association relationship between points of interest and map services, at least one candidate map service associated with the target point of interest.

The target map service unit is configured to screen the at least one candidate map service according to user attribute information to obtain a target map service.

In an optional embodiment, the user attribute information includes at least one of the following: user query time, user location information, a user traveling mode, or a user preference.

In technical solutions of this embodiment, the electronic map may provide the target point of interest for the user according to the object in the image for query, enriching the interaction manner of the electronic map. Moreover, the electronic map may also provide a map service for the user, expanding functions of the electronic map.

Operations including acquisition, storage, and application on a user's personal information involved in technical solutions of the present disclosure conform to relevant laws and regulations and do not violate the public policy doctrine.

According to embodiments of the present disclosure, the present disclosure also provides an electronic device, a readable storage medium, and a computer program product.

Figure 6:
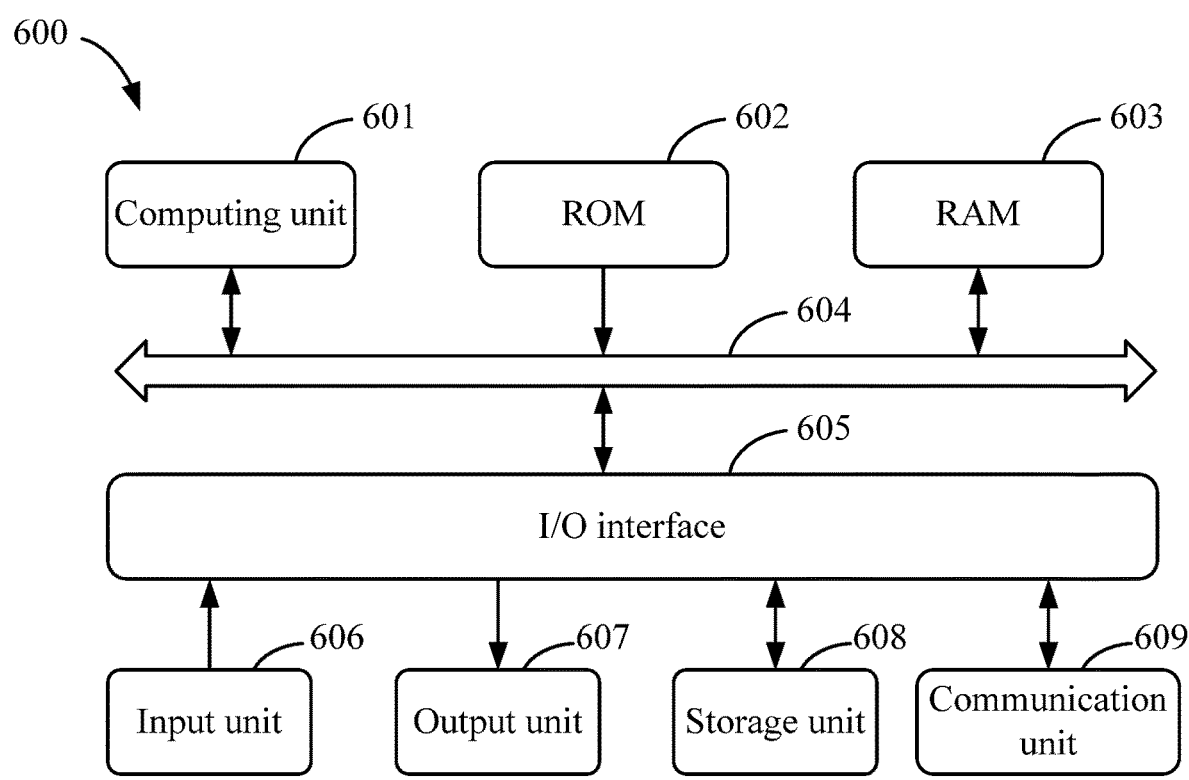
FIG. 6 is a block diagram of an electronic device for implementing a method for processing map information according to embodiments of the present disclosure.

FIG. 6 is a block diagram illustrating an exemplary electronic device 600 that may be configured to perform embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 6, the device 600 includes a computing unit 601. The computing unit 601 may perform various types of appropriate operations and processing based on a computer program stored in a read-only memory (ROM) 602 or a computer program loaded from a storage unit 608 to a random-access memory (RAM) 603. Various programs and data required for operations of the device 600 may also be stored in the RAM 603. The computing unit 601, the ROM 602, and the RAM 603 are connected to each other by a bus 604. An input/output (I/O) interface 605 is also connected to the bus 604.

Multiple components in the device 600 are connected to the I/O interface 605. The multiple components include an input unit 606 such as a keyboard and a mouse, an output unit 607 such as various types of displays and speakers, the storage unit 608 such as a magnetic disk and an optical disk, and a communication unit 609 such as a network card, a modem or a wireless communication transceiver. The communication unit 609 allows the device 600 to exchange information/data with other devices over a computer network such as the Internet and/or various telecommunications networks.

The computing unit 601 may be various general-purpose and/or special-purpose processing components having processing and computing capabilities. Examples of the computing unit 601 include, but are not limited to, a central processing unit (CPU), a graphics processing unit (GPU), a special-purpose artificial intelligence (AI) computing chip, a computing unit executing machine learning model algorithms, a digital signal processor (DSP) and any appropriate processor, controller and microcontroller. The computing unit 601 performs the preceding various methods and processing such as the method for processing map information. For example, in some embodiments, the method for processing map information may be implemented as computer software programs tangibly contained in a machine-readable medium such as the storage unit 608. In some embodiments, part or all of computer programs may be loaded and/or installed on the device 600 via the ROM 602 and/or the communication unit 609. When the computer programs are loaded to the RAM 603 and executed by the computing unit 601, one or more steps of the method for processing map information may be performed. Alternatively, in other embodiments, the computing unit 601 may be configured, in any other suitable manner (for example, by means of firmware), to perform the method for processing map information.

Herein various embodiments of the systems and techniques described in the preceding may be performed in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for the implementation of the methods of the present disclosure may be written in one programming language or any combination of multiple programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A method for processing map information, executed by an electronic device, comprising:
   determining a main object in an image for query;
   determining scene environment information of the main object in the image for query;
   determining, according to the scene environment information of the main object, map query intention represented by the main object in the scene environment and taking the map query intention as an object recognition result, wherein the scene environment information of the main object is used for describing scene environment of the main object in the image for query, the scene environment is determined according to an object other than the main object, and the map query intention is used for representing a point-of-interest query requirement of a user; and
   selecting, according to the object recognition result, a target point of interest matching the image for query from at least one candidate point of interest of an electronic map.

2. The method according to claim 1, wherein determining the scene environment information of the main object in the image for query comprises:
   determining a spatial relationship between the main object in the image for query and another object in the image for query;
   determining background information of the image for query; and
   determining the scene environment information of the main object in the image for query according to at least one of the spatial relationship or the background information.

3. The method according to claim 1, wherein selecting, according to the object recognition result, the target point of interest matching the image for query from the at least one candidate point of interest of the electronic map comprises:
   determining, according to a preset association relationship between objects and map services, at least one candidate map service associated with the object recognition result;
   selecting a target map service from the at least one candidate map service; and
   in a case where the target map service belongs to an offline service, selecting, according to the target map service, the target point of interest matching the image for query from the at least one candidate point of interest of the electronic map.

4. The method according to claim 3, wherein selecting the target map service from the at least one candidate map service comprises:
   screening the at least one candidate map service according to user attribute information to obtain at least one remaining candidate map service;
   presenting the at least one remaining candidate map service to the user; and
   selecting the target map service from the at least one candidate map service according to a selection operation on the at least one remaining candidate map service.

5. The method according to claim 1, wherein selecting the target point of interest matching the image for query from the at least one candidate point of interest of the electronic map comprises:
   taking, according to a preset association relationship between objects and point-of-interest types, a candidate point-of-interest type to which the object recognition result belongs as a target point-of-interest type; and
   selecting, from the at least one candidate point of interest of the electronic map, a candidate point of interest which belongs to the target point-of-interest type and whose point-of-interest tag comprises the object recognition result and taking the selected candidate point of interest as the target point of interest matching the image for query.

6. The method according to claim 5, after selecting the target point of interest matching the image for query from the at least one candidate point of interest of the electronic map, further comprising:
   determining, according to a preset association relationship between point of interests and map services, at least one candidate map service associated with the target point of interest; and
   screening the at least one candidate map service according to user attribute information to obtain a target map service.

7. The method according to claim 4, wherein the user attribute information comprises at least one of the following: user query time, user location information, a user traveling mode, or a user preference.

8. The method according to claim 6, wherein the user attribute information comprises at least one of the following: user query time, user location information, a user traveling mode, or a user preference.

9. An apparatus for processing map information, comprising:
   at least one processor; and
   a memory communicatively connected to the at least one processor,
   wherein the memory stores instructions executable by the at least one processor, and the instructions are executed by the at least one processor to cause the at least one processor to perform the following steps:
   determining a main object in an image for query;
   determining scene environment information of the main object in the image for query;
   determining, according to the scene environment information of the main object, map query intention represented by the main object in the scene environment and taking the map query intention as an object recognition result, wherein the scene environment information of the main object is used for describing scene environment of the main object in the image for query, the scene environment is determined according to an object other than the main object, and the map query intention is used for representing a point-of-interest query requirement of a user; and
   selecting, according to the object recognition result, a target point of interest matching the image for query from at least one candidate point of interest of an electronic map.

10. The apparatus according to claim 9, wherein determining the scene environment information of the main object in the image for query comprises:
    determining a spatial relationship between the main object in the image for query and another object in the image for query;

a background sub-unit configured to determine background information of the image for query; and determining the scene environment information of the main object in the image for query according to at least one of the spatial relationship or the background information.

11. The apparatus according to claim 9, wherein selecting, according to the object recognition result, the target point of interest matching the image for query from the at least one candidate point of interest of the electronic map comprises:

determining, according to a preset association relationship between objects and map services, at least one candidate map service associated with the object recognition result;

selecting a target map service from the at least one candidate map service; and in a case where the target map service belongs to an offline service, selecting, according to the target map service, the target point of interest matching the image for query from the at least one candidate point of interest of the electronic map.

12. The apparatus according to claim 11, wherein selecting the target map service from the at least one candidate map service comprises:

screening the at least one candidate map service according to user attribute information to obtain at least one remaining candidate map service;

presenting the at least one remaining candidate map service to the user; and selecting the target map service from the at least one candidate map service according to a selection operation on the at least one remaining candidate map service.

13. The apparatus according to claim 9, wherein selecting the target point of interest matching the image for query from the at least one candidate point of interest of the electronic map comprises:

taking, according to a preset association relationship between objects and point-of-interest types, a candidate point-of-interest type to which the object recognition result belongs as a target point-of-interest type; and selecting, from the at least one candidate point of interest of the electronic map, a candidate point of interest which belongs to the target point-of-interest type and whose point-of-interest tag comprises the object recognition result and take the selected candidate point of interest as the target point of interest matching the image for query.

14. The apparatus according to claim 13, wherein after selecting the target point of interest matching the image for query from the at least one candidate point of interest of the electronic map, further comprises:

determining, according to a preset association relationship between points of interest and map services, at least one candidate map service associated with the target point of interest; and screening the at least one candidate map service according to user attribute information to obtain a target map service.

15. The apparatus according to claim 12, wherein the user attribute information comprises at least one of the following: user query time, user location information, a user traveling mode, or a user preference.

16. The apparatus according to claim 14, wherein the user attribute information comprises at least one of the following: user query time, user location information, a user traveling mode, or a user preference.

17. A non-transitory computer-readable storage medium storing computer instructions for causing a computer to perform the following steps:

determining a main object in an image for query;

determining scene environment information of the main object in the image for query;

determining, according to the scene environment information of the main object, map query intention represented by the main object in the scene environment and taking the map query intention as an object recognition result, wherein the scene environment information of the main object is used for describing scene environment of the main object in the image for query, the scene environment is determined according to an object other than the main object, and the map query intention is used for representing a point-of-interest query requirement of a user; and selecting, according to the object recognition result, a target point of interest matching the image for query from at least one candidate point of interest of an electronic map.

* * * * *